United States Patent
Carlisle

(10) Patent No.: US 9,243,561 B2
(45) Date of Patent: Jan. 26, 2016

(54) COMBUSTOR HEAD ARRANGEMENT

(71) Applicant: ROLLS-ROYCE PLC, London (GB)

(72) Inventor: Michael Lawrence Carlisle, Derby (GB)

(73) Assignee: ROLLS-ROYCE plc, London (GB)

( * ) Notice: Subject to any disclaimer, the term of this patent is extended or adjusted under 35 U.S.C. 154(b) by 345 days.

(21) Appl. No.: 13/693,863

(22) Filed: Dec. 4, 2012

(65) Prior Publication Data

US 2013/0199194 A1 Aug. 8, 2013

(30) Foreign Application Priority Data

Feb. 7, 2012 (GB) .................................... 1202055.8

(51) Int. Cl.
| | |
|---|---|
| *F23R 3/60* | (2006.01) |
| *F02C 7/00* | (2006.01) |
| *F02C 9/00* | (2006.01) |
| *F23R 3/00* | (2006.01) |
| *F23R 3/14* | (2006.01) |
| *F23R 3/28* | (2006.01) |

(52) U.S. Cl.
CPC ... *F02C 7/00* (2013.01); *F02C 9/00* (2013.01); *F23R 3/002* (2013.01); *F23R 3/14* (2013.01); *F23R 3/283* (2013.01); *F23R 3/286* (2013.01); *F23R 2900/00017* (2013.01)

(58) Field of Classification Search
CPC .............. F23R 3/00; F23R 3/60; F23R 3/002; F23R 2900/00012; F23R 2900/00017; F23R 2900/00019; F23R 3/20; F05D 2260/30
USPC ..................... 60/756, 796, 798, 737
See application file for complete search history.

(56) References Cited

U.S. PATENT DOCUMENTS

| | | | | |
|---|---|---|---|---|
| 5,996,335 | A * | 12/1999 | Ebel ................................. | 60/800 |
| 2005/0034459 | A1* | 2/2005 | McMasters ............. | F23R 3/002 60/752 |
| 2006/0207258 | A1* | 9/2006 | Tanner ...................... | F23C 5/02 60/748 |
| 2007/0028620 | A1* | 2/2007 | McMasters ............. | F23R 3/286 60/748 |
| 2008/0016874 | A1* | 1/2008 | Markarian ............... | F23R 3/002 60/772 |
| 2008/0202122 | A1 | 8/2008 | Guezengar et al. | |
| 2008/0282703 | A1* | 11/2008 | Morenko ................. | F23R 3/002 60/796 |
| 2011/0005231 | A1* | 1/2011 | Low .......................... | F23R 3/14 60/740 |

OTHER PUBLICATIONS

May 30, 2012 British Search Report issued in British Patent Application No. GB 1202055.8.

* cited by examiner

*Primary Examiner* — Ehud Gartenberg
*Assistant Examiner* — Thomas Burke
(74) *Attorney, Agent, or Firm* — Oliff PLC

(57) ABSTRACT

A combustor head arrangement including a heatshield including an aperture therethrough. A meter panel having a cold side and a hot side, an aperture and a slot. At least one of the meter panel and the heatshield has a retaining feature on the cold side; one of the meter panel and the heatshield has an anti-rotation feature. The arrangement includes a burner seal sized to fit through the aperture in the meter panel from the hot side towards the cold side. The burner seal has a tang configured to pass through the slot when the burner seal is in a first orientation and to be retained by the retaining feature and the anti-rotation feature when the burner seal is rotated to a second orientation. Also a method of assembling the combustor head.

23 Claims, 5 Drawing Sheets

COMBUSTOR HEAD ARRANGEMENT

The present invention relates to a combustor head arrangement and a method of assembling such. It finds particular utility for a gas turbine engine combustor head.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

The combustor head arrangement of a known annular combustor 20 is shown in more detail in FIG. 2. A combustion chamber 34 is defined by combustor wall 36 and an annular meter panel 38 at its upstream end, that is nearer the high pressure compressor 18. The meter panel 38 thus has an upstream cold side 40 facing the high pressure compressor 18 and a downstream hot side 42 facing the combustion chamber 34. An annular location ring 44 is coupled to the inside of an aperture 50 in the meter panel 38 and acts to locate a burner seal 46 which is mounted from the cold side 40 of the meter panel 38. A heatshield 80 is provided on the hot side 42 of the meter panel 38. A burner 48 is then mounted through the burner seal 46 from the cold side 40.

FIG. 3 is a radial section through the combustor head viewed on the cold side 40 of the meter panel 38. The meter panel 38 comprises a number of apertures 50 each ready to receive a location ring 44, a burner seal 46 and then a burner 48 therethrough. The combustor head comprises a single letter box aperture 52 located at bottom dead centre of the combustor 20. Thus to assemble the combustor head, each location ring 44 is inserted through the letter box aperture 52, passed around the combustor head as indicated by one of arrows 54 and then inserted into the appropriate aperture 50 in the meter panel 38. Then each burner seal 46 is inserted in the same manner. Finally, the burner 48 is inserted through the aperture 50 via a small aperture in the combustor casing (not shown) that is aligned with the aperture 50. Then the whole process is repeated for the next aperture 50 towards bottom dead centre.

This arrangement and method of assembly is disadvantageous in several respects. The combustor head arrangement must be assembled sequentially with the apertures 50 closest to top dead centre of the combustor 20 being loaded with their location rings 44 and burner seals 46 followed by the next closest apertures 50 and so on until those closest to bottom dead centre are loaded. As will be readily understood, it is awkward to manoeuvre the components into the required position, particularly for those apertures 50 near top dead centre of the combustor 20. Thus it takes excessive time to assemble the combustor head and risks damage to the components or injury to the person assembling the combustor head. If one or more location rings 44 or burner seals 46 needs servicing or replacement, each of the sets of components between it and the letter box aperture 52 must be removed before the desired components can be removed. This is also time consuming and inefficient.

The present invention provides a combustor head arrangement and a method of assembling a combustor head arrangement that seeks to address the aforementioned problems.

Accordingly the present invention provides a combustor head arrangement, the arrangement comprising: a meter panel having a cold side and a hot side, the meter panel having an aperture and a slot each extending through the meter panel between the hot and cold sides; a heatshield comprising an aperture therethrough; at least one of the meter panel and the heatshield comprising a retaining feature on the cold side; one of the meter panel and the heatshield comprising an anti-rotation feature; and a burner seal sized to fit through the aperture in the meter panel from the hot side towards the cold side and rotatable between a first orientation and a second orientation, the burner seal comprising a tang configured to pass through the slot when the burner seal is in the first orientation and to be retained by the retaining feature and the anti-rotation feature when the burner seal is in the second orientation.

Advantageously, the combustor head arrangement of the present invention is assembled from the hot side of the meter panel. Assembly and disassembly is quick, easy and safe. There is a component, cost and weight reduction compared to known arrangements.

There may be more than one tang spaced around the burner seal. The tangs may be equally spaced around the burner seal.

The anti-rotation feature may comprise a pair of members that circumferentially abut the tang to prevent circumferential movement. Advantageously, the burner seal may be locked in the second orientation.

The heatshield may comprise studs which penetrate apertures in the meter panel to prevent relative movement of the heatshield and the meter panel.

The retaining feature may comprise an L-shaped member to partially envelop the tang to prevent radial and axial movement. Alternatively the retaining feature may comprise a retaining strap or a recess to receive the tang.

The anti-rotation feature may be provided on the cold side of the meter panel or be provided on the heatshield. The retaining feature may be provided on the heatshield or on the cold side of the meter panel.

The heatshield may comprise a collar.

The meter panel may comprise more than one aperture. There may be a burner seal for each meter panel aperture. There may be a retaining feature for each meter panel aperture. There may be an anti-rotation feature for each meter panel aperture. The heatshield may comprise an aperture for each aperture in the meter panel or there may be a heatshield for each meter panel aperture.

The present invention also provides a combustor comprising a combustor head arrangement as described, a gas turbine engine comprising a combustor head arrangement as described and a gas turbine engine comprising a combustor as described.

The present invention also provides a method of assembling a combustor head, the method comprising: providing a meter panel having a cold side and a hot side, an aperture and a slot each extending through the meter panel between the hot and cold sides; inserting a burner seal through the meter panel aperture from the hot side, the burner seal having a tang that aligns with and passes through the slot in a first orientation of the burner seal; rotating the burner seal about its axis so that the tang is out of alignment with the slot; inserting a heatshield round the burner seal and through the meter panel aperture from the hot side; and retaining the burner seal in its second orientation using a retaining feature and an anti-rotation feature.

Advantageously the method is quick, easy and safe. It comprises assembling fewer components than in known methods and is therefore cheaper and simpler.

The meter panel may comprise multiple apertures, the heatshield may comprise multiple apertures and the method may comprise iterating the steps of inserting the burner seal and rotating the burner seal for each meter panel aperture before the step of inserting the heatshield. Alternatively, the meter panel may comprise multiple apertures, and the method may comprise iterating the steps of inserting the burner seal, rotating the burner seal and inserting a heatshield for each meter panel aperture.

The anti-rotation feature may be provided on the heatshield or the cold side of the meter panel. The retaining feature may be provided on the cold side of the meter panel or on the heatshield.

The method may further comprise a step of attaching a retaining strip on the cold side of the meter panel.

Any combination of the optional features is encompassed within the scope of the invention except where mutually exclusive.

The present invention will be more fully described by way of example with reference to the accompanying drawings, in which.

Figure 1:
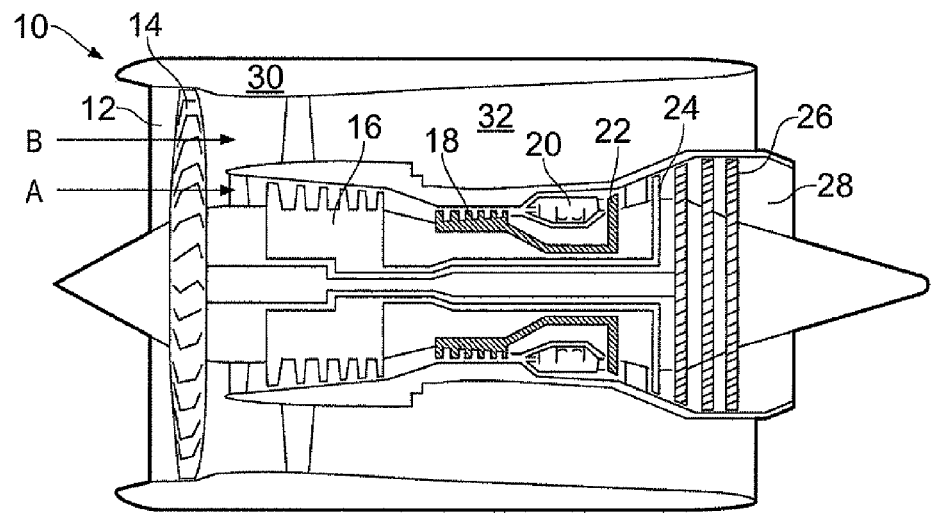
FIG. 1 is a sectional side view of a gas turbine engine.
Figure 2:
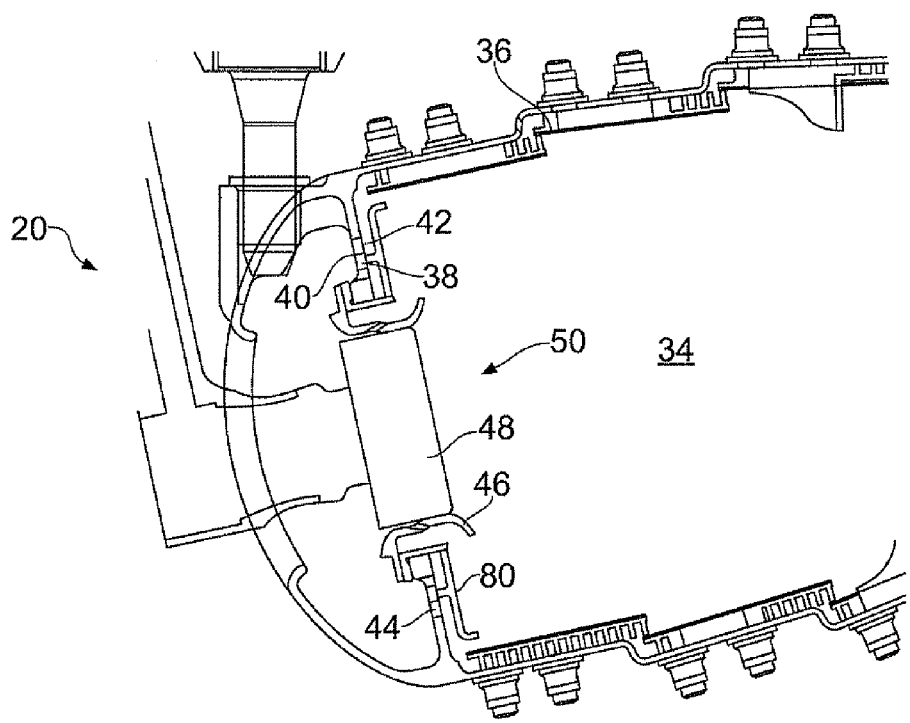
FIG. 2 is a schematic illustration of a known combustor head.
Figure 3:
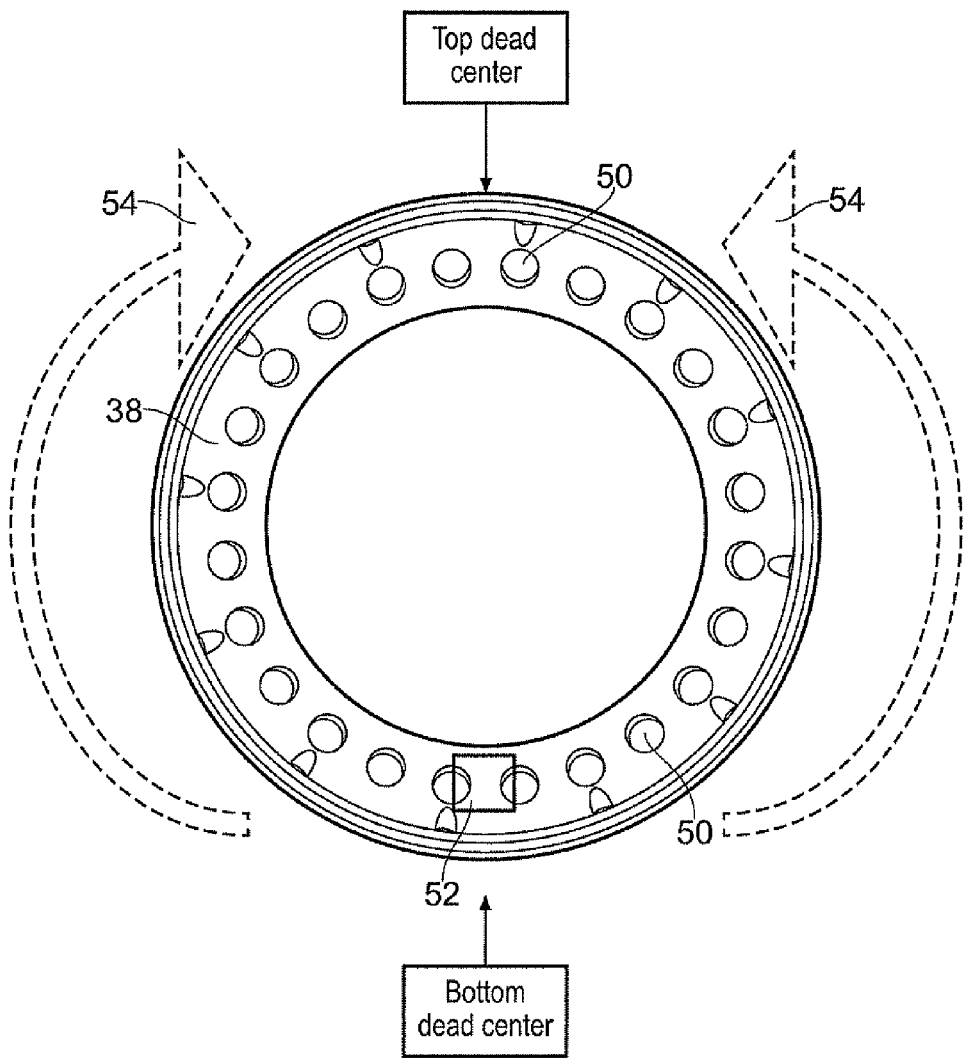
FIG. 3 is a radial section of the known combustor head of FIG. 2.
Figure 4:
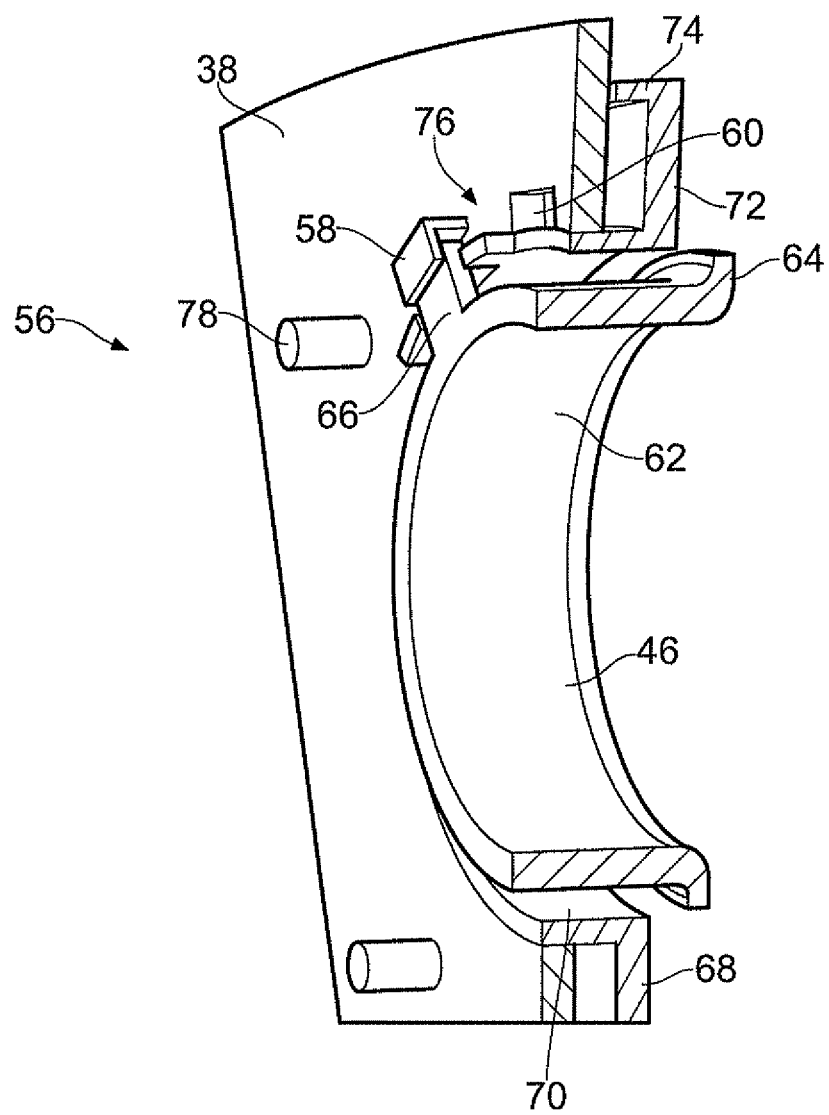
FIG. 4 is a partial perspective view of a combustor head arrangement according to the present invention.
Figure 5:
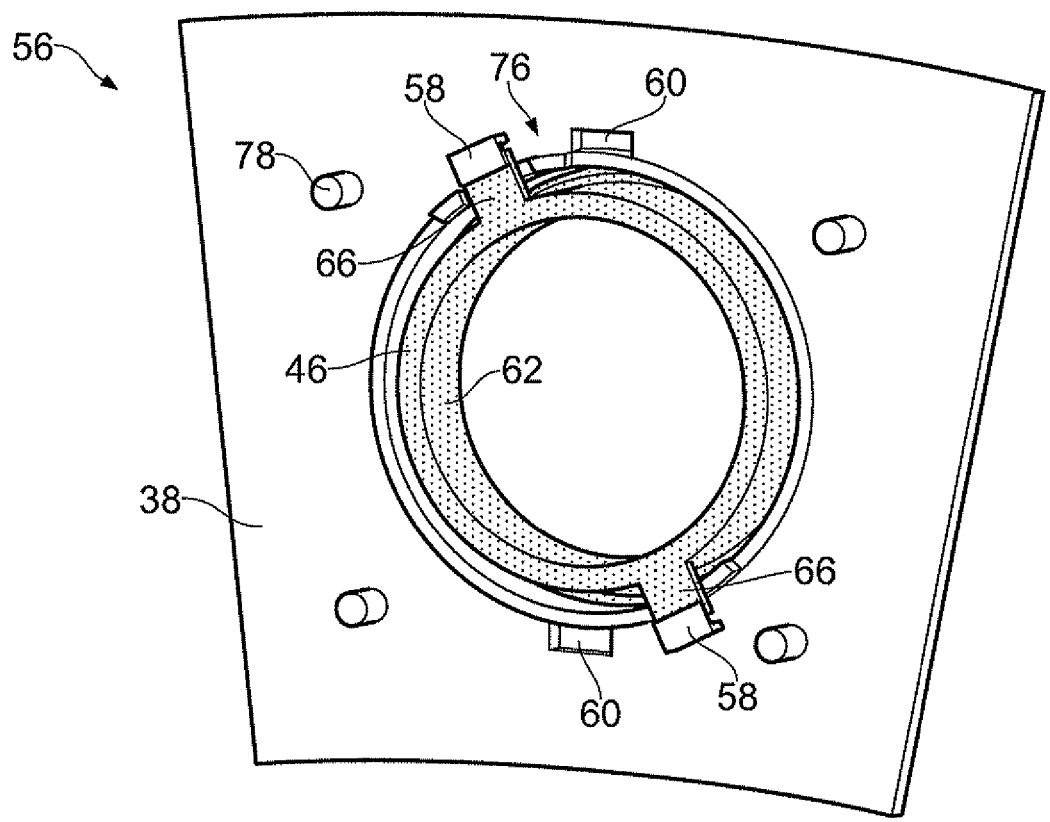
FIG. 5 is a radial sectional view of the combustor head arrangement according to the present invention.

An exemplary embodiment of the combustor head arrangement 56 of the present invention is shown in FIGS. 4 and 5. The combustor chamber 34 is defined by wall 36 and a meter panel 38 as in the known arrangement described above. The meter panel 38 comprises an aperture 50 for each burner 48 (not shown), the apertures 50 forming an annular array about the engine axis. Terms such as "axial" and "radial" are herein defined with respect to an axis which extends through the centre of each aperture 50 and is perpendicular to the plane of the meter panel 38. The meter panel 38 comprises at least one retaining feature 58 on its cold side 40, two being shown diametrically opposed in FIG. 5, and at least one slot 60 which extends through the meter panel 38 from its cold side 40 to its hot side 42 and is open to the aperture 50. The burner seal 46 comprises a collar 62 that extends axially to form a cylindrical or annular shape and a lip 64 that extends radially outwardly from the downstream edge of the collar 62. There may be a fillet radius between the collar 62 and the lip 64. The collar 62 is sized to fit through the aperture 50 in the meter panel 38 from the hot side 42 while the lip 64 is sized to turn a cooling flow of air through the aperture 50.

The burner seal 46 according to the present invention comprises at least one tang 66, two being shown diametrically opposed in FIG. 5. Each tang 66 extends radially outwardly from the upstream edge of the collar 62 and is sized to pass through one of the slots 60. Thus the meter panel 38 has the same number and distribution of slots 60 as the burner seal 46 has tangs 66. The method of the present invention comprises inserting the burner seal 46 through the meter panel aperture 50 from the hot side 42. In a first orientation, the at least one tang 66 passes through the at least one slot 60. The burner seal 46 is inserted sufficiently far that the tang 66 is unencumbered by the meter panel 38; a small upstream part of the collar 62 will also protrude past the meter panel 38.

The method comprises another step of rotating the burner seal 46 to a second orientation, shown in FIGS. 4 and 5, in which axial and radial movement of the at least one tang 66, and therefore the burner seal 46, is prevented by the retaining feature 58. The retaining feature 58 in the exemplary embodiment is an L-shaped member having one part extending axially upstream from the cold side 40 of the meter panel 38 and a second part extending from the distal end of the first part radially inwardly towards the axis of the aperture 50. Thus the retaining feature 58 partially envelops the tang 66 in order to prevent axial or radial movement.

The method of the present invention comprises a further step of inserting a heatshield 68 through the aperture 50 radially outwardly of the burner seal 46. The heatshield 68 is inserted from the hot side 42 of the meter panel 38 towards the cold side 40. The heatshield 68 combines the functions of shielding the meter panel 38 from heat and locating the burner seal 46 relative to the meter panel 38. The heatshield 68 is annular and comprises a collar 70 which extends axially, a skirt 72 which extends radially outwards from the downstream edge of the collar 70 and a locating portion 74 which extends axially upstream from the edge of the skirt 72 distal to the collar 70. The locating portion 74 may be adapted or configured to engage with appropriate features (not shown) of the meter panel 38 in order to locate the heatshield 68 relative to the meter panel 38. Such features may enable locating in some or all of the axial, radial and circumferential directions. The locating portion 74 may also be adapted or configured to form a channel between the heatshield 68 and the meter panel 38 through which cooling air may flow.

Optionally the heatshield 68 may comprise studs 78 which protrude axially upstream through apertures in the meter panel 38 to locate and secure the heatshield 68 relative to the meter panel 38. The studs 78 may be threaded to receive nuts or comprise other means to be secured once inserted through the meter panel 38. The studs 78 may be identical and symmetrically arranged or may be different and/or arranged in a non-symmetric pattern to assist correct orientation of the heatshield 68.

The heatshield 68 further comprises at least one anti-rotation feature 76 located on the upstream edge of the collar 70. In the exemplary embodiment each anti-rotation feature 76 comprises a pair of members that extend axially upstream from the collar 70 and are arranged so that each abuts one circumferential side of the tang 66 to prevent rotation of the burner seal 46 from its second orientation. There is preferably an anti-rotation feature 76 provided for each tang 66. Alternatively there may be a single anti-rotation feature 76, such as the illustrated pair of members, which engages one of at least two tangs 66.

Thus the method of the present invention comprises inserting the burner seal 46 through the meter panel 38 from the hot side 42 whereas the known method comprised inserting it from the cold side 40. Advantageously, the combustion chamber 34 is comparatively roomy so the burner seals 46 can be inserted quickly and without awkward manoeuvring, damage or injury. Additionally, the burner seals 46 can be assembled in any order instead of requiring sequential assembly from top dead centre towards bottom dead centre of the combustor 20. The components are disassembled by extracting them through the meter panel hot side 42 into the combustion chamber 34. Therefore, they may be disassembled out of sequence or only the requisite burner seals 46 be disassembled. Quicker and more efficient assembly and disassembly is cheaper and safer.

The combustor head arrangement 56 of the present invention is also lighter than the known combustor head because the location ring 44 is obviated for each burner 48. Reduced part count results in reduced cost.

Figure 6:
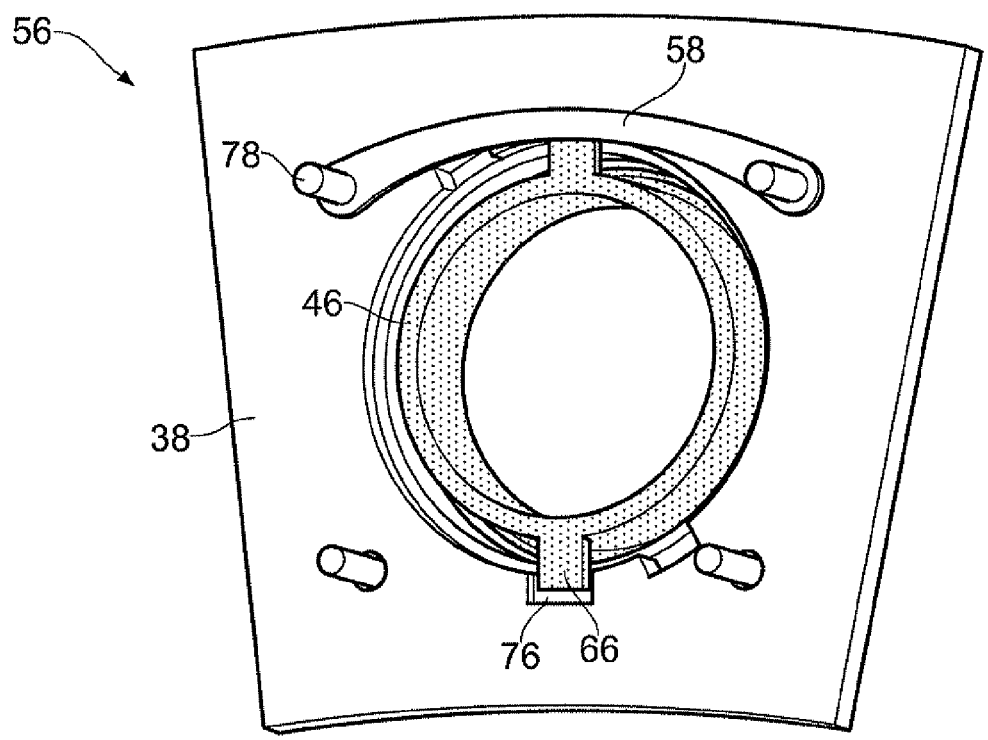
FIG. 6 is a radial sectional view of a modification of the combustor head arrangement according to the present invention.

A modification to the combustor head arrangement 56 is shown in FIG. 6. Here the anti-rotation feature 76 comprises a recess provided in the cold side 40 of the meter panel 38 which is sized to receive the tang 66. Thus the method requires rotating the burner seal 46 to its second orientation and then moving it axially towards the combustion chamber 34 sufficiently to seat the tang 66 into the recess 76. There should be one recess 76 for each tang 66 so the array of recesses 76 should be arranged to complement the array of tangs 66. The recess 76 prevents both circumferential and radial movement of the tang 66.

In this modification of the combustion head arrangement 56 the retaining feature 58 comprises a strip which may advantageously be coupled between studs 78 of the heatshield 68. The strip 58 is attached from the cold side 40 once the heatshield 68 has been inserted and is arranged to close the open side of the recess 76 so that the tang 66 cannot move axially.

Generally a combustor head arrangement 56 according to the present invention comprises a meter panel 38 comprising an annular array of apertures 50 each of which receives a burner seal 46. Thus the method of the present invention may comprise iterating the steps of inserting a burner seal 46 and rotating the burner seal 46 from its first to its second orientation. The heatshield 68 may comprise an array of collars 62 and lips 64, in which case the heatshield 68 is inserted after all the burner seals 46 have been inserted and rotated. Alternatively there may be a heatshield 68 for each burner seal 46, in which case each heatshield 68 may be inserted after its burner seal 46 has been inserted and rotated or all the heatshields 68 may be inserted after all the burner seals 46 have been inserted and rotated. Advantageously, there is no need to insert the burner seals 46 sequentially around the annular meter panel 38 or to insert the heatshields 68 sequentially where an array of heatshields 68 is provided. This means that the components may be inserted in a sequence using diametrically opposed pairs so better balance of the combustor head arrangement 56 is achieved.

The invention claimed is:

1. A combustor head arrangement, the arrangement comprising:
    a meter panel having a cold side and a hot side, the meter panel having an aperture and a slot each extending through the meter panel between the hot and cold sides;
    a heat shield comprising an aperture therethrough;
    at least one of the meter panel and the heat shield comprising a retaining feature on the cold side;
    one of the meter panel and the heatshield comprising an anti-rotation feature; and
    a burner seal sized to fit through the aperture in the meter panel from the hot side towards the cold side and rotatable between a first orientation and a second orientation, the burner seal comprising a tang configured to pass through the slot when the burner seal is in the first orientation and to be retained by the retaining feature and the anti-rotation feature when the burner seal is in the second orientation.

2. A combustor head arrangement as claimed in claim 1 wherein there is more than one tang spaced around the burner seal.

3. A combustor head arrangement as claimed in claim 2 wherein the tangs are equally spaced around the burner seal.

4. A combustor head arrangement as claimed in claim 1 wherein the anti-rotation feature comprises a pair of members that circumferentially abut the tang to prevent circumferential movement.

5. A combustor head arrangement as claimed in claim 1 wherein the heat shield comprises studs which penetrate apertures in the meter panel to prevent relative movement of the heat shield and the meter panel.

6. A combustor head arrangement as claimed in claim 1 wherein the retaining feature comprises an L-shaped member to partially envelop the tang to prevent radial and axial movement.

7. A combustor head arrangement as claimed in claim 1 wherein the retaining feature comprises one of the group comprising: a retaining strap; and a recess to receive the tang.

8. A combustor head arrangement as claimed in claim 1 wherein the anti-rotation feature is provided on the heat shield or on the cold side of the meter panel.

9. A combustor head arrangement as claimed in claim 1 wherein the retaining feature is provided on the heat shield or on the cold side of the meter panel.

10. A combustor head arrangement as claimed in claim 1 wherein the heat shield comprises a collar.

11. A combustor head arrangement as claimed in claim 1 wherein the meter panel comprises more than one aperture.

12. A combustor head arrangement as claimed in claim 11 comprising one or more of: a burner seal for each meter panel aperture; a retaining feature for each meter panel aperture; and an anti-rotation feature for each meter panel aperture.

13. A combustor head arrangement as claimed in claim 11 wherein the heat shield comprises an aperture for each aperture in the meter panel.

14. A combustor head arrangement as claimed in claim 11 comprising a heat shield for each meter panel aperture.

15. A combustor comprising a combustor head arrangement as claimed in claim 1.

16. A gas turbine engine comprising a combustor head arrangement as claimed in claim 1.

17. A gas turbine engine comprising a combustor as claimed in claim 15.

18. A method of assembling a combustor head, the method comprising:
    providing a meter panel having a cold side and a hot side, an aperture and a slot each extending through the meter panel between the hot and cold sides;
    inserting a burner seal through the meter panel aperture from the hot side, the burner seal having a tang that aligns with and passes through the slot in a first orientation of the burner seal;
    rotating the burner seal about a central longitudinal axis of the burner seal so that the tang is out of alignment with the slot;
    inserting a heat shield around the burner seal and through the meter panel aperture from the hot side; and
    retaining the burner seal in a second orientation using a retaining feature and an anti-rotation feature.

19. A method as claimed in claim 18 wherein the meter panel comprises multiple apertures, the heat shield comprises multiple apertures and the method comprises iterating inserting the burner seal and rotating the burner seal for each meter panel aperture before inserting the heat shield.

20. A method as claimed in claim 18 wherein the meter panel comprises multiple apertures, and the method comprises iterating inserting the burner seal, rotating the burner seal and inserting a heat shield for each meter panel aperture.

21. A method as claimed in claim 18 wherein the anti-rotation feature is provided on the heat shield or on the cold side of the meter panel.

22. A method as claimed in claim 18 wherein the retaining feature is provided on the heat shield or on the cold side of the meter panel.

23. A method as claimed in claim 18 further comprising:
    attaching a retaining strip on the cold side of the meter panel.

* * * * *